(12) United States Patent
Engel et al.

(10) Patent No.: US 9,649,889 B2
(45) Date of Patent: May 16, 2017

(54) AUTONOMOUS, PLUG-IN WEAR OR ABRASION SENSING SYSTEM

(71) Applicant: The Goodyear Tire & Rubber Company, Akron, OH (US)

(72) Inventors: Marc Engel, Bissen (LU); Dusan Lednik, Lintgen (LU); Piotr Orlewski, Ettelbruck (LU); Bart Wakefield Kimble, Stow, OH (US); Krzysztof Florian Jakubiak, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 542 days.

(21) Appl. No.: 13/780,930

(22) Filed: Feb. 28, 2013

(65) Prior Publication Data
US 2014/0166168 A1 Jun. 19, 2014

Related U.S. Application Data

(60) Provisional application No. 61/736,685, filed on Dec. 13, 2012.

(51) Int. Cl.
*B60C 23/00* (2006.01)
*B60C 11/00* (2006.01)
(Continued)

(52) U.S. Cl.
CPC ........ *B60C 11/243* (2013.04); *B60C 23/0433* (2013.01); *G01S 1/022* (2013.01); *Y10T 152/10027* (2015.01)

(58) Field of Classification Search
CPC ....... B60C 11/00; B60C 11/24; B60C 11/243; B60C 11/246
See application file for complete search history.

(56) References Cited

U.S. PATENT DOCUMENTS

| 6,523,586 B1 | 2/2003 | Eronäki et al. ............ 152/154.2 |
| 7,557,694 B1 | 7/2009 | Graham ........................ 340/438 |

(Continued)

FOREIGN PATENT DOCUMENTS

| DE | 19745734 | * 4/1999 | |
| DE | 19838638 | 3/2000 | ............... G01L 5/18 |

(Continued)

OTHER PUBLICATIONS

European Search Report received by Applicants Feb. 24, 2014.
Yokohama Rubber Co. Ltd., JP2005028950 Translation, Feb. 3, 2005.

*Primary Examiner* — Justin Fischer
(74) *Attorney, Agent, or Firm* — Edward T. Kennedy

(57) ABSTRACT

An autonomous, plug-in and sacrificial wear sensing system including at least one wearable sensor, autonomous energy supply and means for remote radio-frequency communication. The system includes a tubular tread wear indicator body embedded within a tire tread element. The indicator body is centered within the tread element and is shaped in the form of a tube. The sensor element operably changes in at least one electromagnetically measurable physical parameter as the tread element wears radially inward. The system provides a full tread wear system including the algorithm for signal and data processing, buffering and decision making routines to remotely provide vehicle driver or owner with current tire wear status, tire type—vehicle—season match and with real-time estimation of remaining tire life.

4 Claims, 4 Drawing Sheets

(51) Int. Cl.
    *B60C 11/24*      (2006.01)
    *G01S 1/02*       (2010.01)
    *B60C 23/04*     (2006.01)

(56) References Cited

U.S. PATENT DOCUMENTS

2005/0242935 A1    11/2005    Kafrawy .................. 340/438
2009/0114322 A1    5/2009    O'Brien .................. 152/154.2

FOREIGN PATENT DOCUMENTS

| DE | 20216290 | * | 1/2003 |
| EP | 383401 | * | 8/1990 |
| JP | 2005-28950 | * | 2/2005 |

* cited by examiner

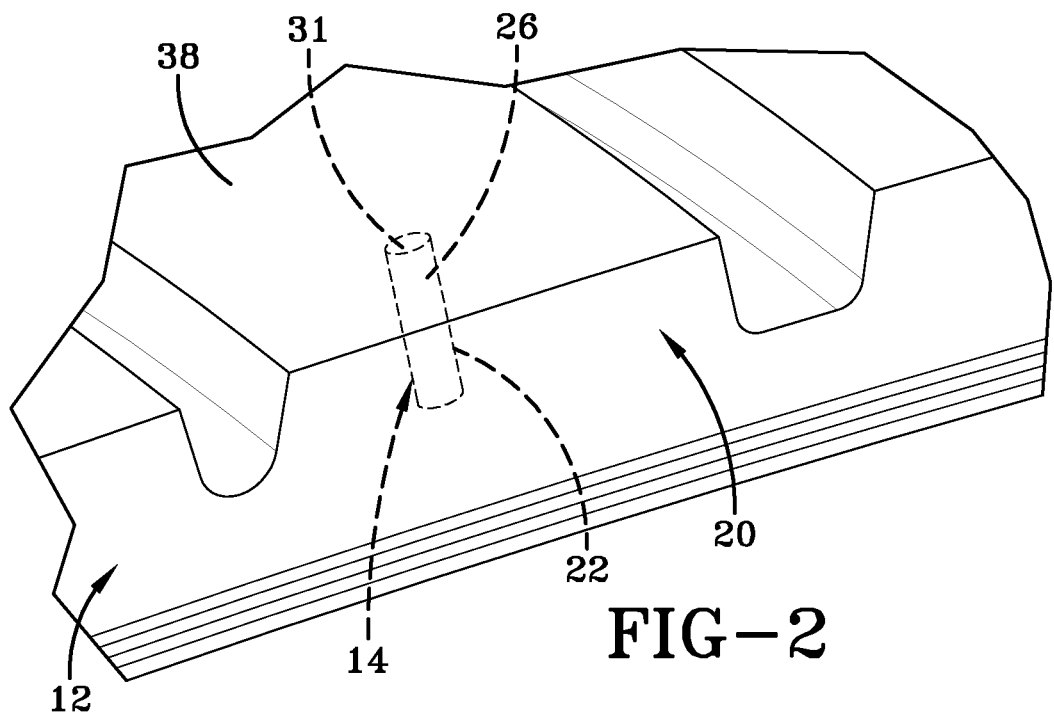
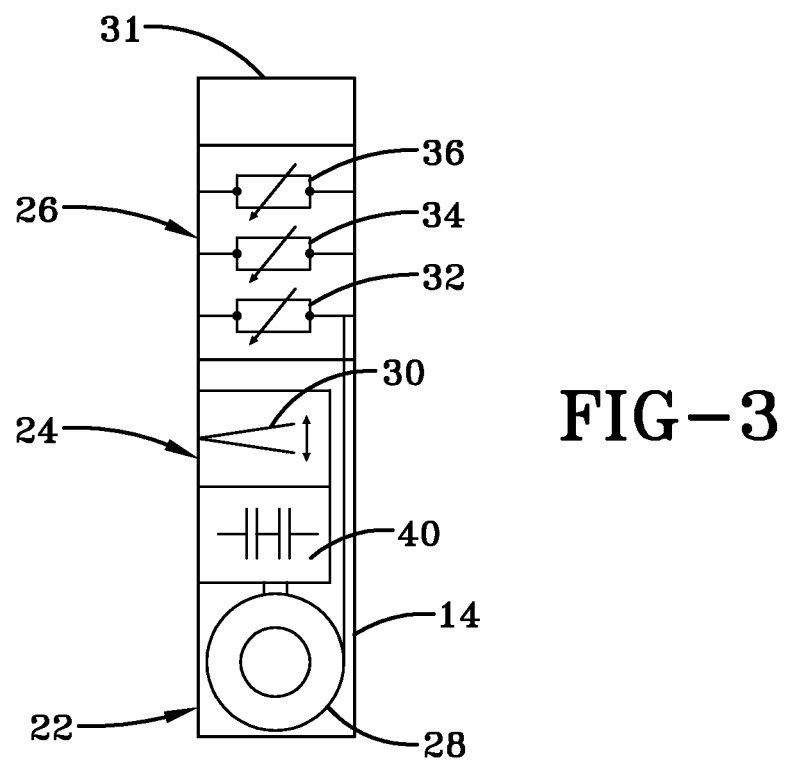

AUTONOMOUS, PLUG-IN WEAR OR ABRASION SENSING SYSTEM

FIELD OF THE INVENTION

The present invention generally relates to a wear sensing system for components or equipments exposed to mechanical abrasion and, more specifically, to wear sensing systems used in a tire application.

BACKGROUND OF THE INVENTION

The use of tread wear indicators is not new and the use of tread wear indicators is mandated by law in many countries. A variety of such indicators are known. Once such type employs colored indicia below the tread for a visual indicator of wear. Other types use tie-bar type elements in the tread grooves.

The practical problem with the colored indicators of the type mentioned is that there is no way for the operator to determine the level of wear until the tire is worn. When the tire employs the tie-bar type wear indicator, it can be difficult to determine the level of wear.

U.S. Pat. No. 6,523,586 discloses wear indicators for a tire tread wherein, in a series, or predetermined closely located grouping, of related marks, the marks disappear as the tire is worn. While this provides continuous information to the consumer, the complexity of forming the tire is increased due to the need to form multiple different marks that appear only after a defined amount of wear.

A tread wear indicator which is readily integrated into a tire and which reliably measures tread wear in a manner easily monitored by a vehicle operator is, accordingly, desired. Additionally, a tread wear indicator is desired that operably is convenient for the end user (i.e. can be read from within the vehicle when raining, at night (darkness), etc.) and can predict tire life based on the exploitation history of the tire.

SUMMARY OF THE INVENTION

In one aspect of the invention, a device is used for indicating tread wear in a tire and, more specifically, involves one or more mutually independent wear sensor(s) for monitoring tread wear and communicating tread wear status to a user. Such small, ubiquitous and self-operating sensor(s) may be applied in different industrial equipments like calenders, sheet feeders, solid or pneumatic wheels, etc. Specifically in manufacturing equipment like calenders, a wear sensor may be advantageously associated to the pressure or force sensor that may be further used by the control system to re-adjust the load of force applied by the calendar in function of its wear. The subject wear sensing system employs sacrificial, wearable sensors that in use undergo abrasion to the same extent and the same amount as the mechanical system in which they are fitted.

According to an additional aspect of the invention, a vehicle tire and tread wear device assembly includes an elongate tread wear indicator body embedded within a tire tread element, the indicator body extending radially outward to an end surface offset a radial distance from a ground engaging surface of the one tread element. Within the indicator body is one or more sensor element(s), a power generating device for supplying operational electrical power; and a transmitter for communicating sensor element status indicative of a radial wear level of the one tread element. The assembly is thus packaged to include a sensor, energy harvester, logic including communication, and an antenna.

In another aspect, the sensor element(s) operably change in at least one electrical parameter as the host tread element and sensor element wear radially inward.

In a further aspect of the invention, the indicator body is located within the one tread element and is shaped in the form of a tube or other packaging configuration such as oval, square, star-shaped etc. The sensor element (s), the power generating device, and the communication transmitter are positioned at respective specified radial locations within the tubular indicator body.

DEFINITIONS

The following definitions are applicable to the present invention.

"Groove" means an elongated void area in a tread that may extend circumferentially or laterally about the tread in a straight curved, or zigzag manner. Circumferentially and laterally extending grooves sometimes have common portions and may be sub classified as "wide", "narrow", or "sipe". The slot typically is formed by steel blades inserted into a cast or machined mold or tread ring therefor. In the appended drawings, slots are illustrated by single lines because they are so narrow. A "sipe" is a groove having a width in the range from about 0.2 percent to 0.8 percent of the compensated tread width, whereas a "narrow groove" has a width in the range from about 0.8 percent to 3 percent of the compensated tread width and a "wide groove" has a width greater than 3 percent thereof. The "groove width" is equal to tread surface area occupied by a groove or groove portion, the width of which is in question, divided by the length of such groove or groove portion; thus, the groove width is its average width over its length. Grooves, as well as other voids, reduce the stiffness of tread regions in which they are located. Sipes often are used for this purpose, as are laterally extending narrow or wide grooves. Grooves may be of varying depths in a tire. The depth of a groove may vary around the circumference of the tread, or the depth of one groove may be constant but vary from the depth of another groove in the tire. If such narrow or wide groove are of substantially reduced depth as compared to wide circumferential grooves which they interconnect, they are regarded as forming "tie bars" tending to maintain a rib-like character in the tread region involved.

"Inner" means toward the inside of the tire and "outer" means toward its exterior.

"Outer" means toward the tire's exterior.

"Radial" and "radially" are used to mean directions radially toward or away from the axis of rotation of the tire.

"Tread" means a molded rubber component which, when bonded to a tire casing, includes that portion of the tire that comes into contact with the road when the tire is normally inflated and under normal load. The tread has a depth conventionally measured from the tread surface to the bottom of the deepest groove of the tire.

"Tread Element" is a protruding portion of a tread such as a lug or rib which constitutes the element that comes into contact with the road.

BRIEF DESCRIPTION OF THE DRAWINGS

The invention will be described by way of example and with reference to the accompanying drawings in which:

FIG. 2 is an enlarged partial perspective view of a tread element containing a wear sensor device.

FIG. 3 is a schematic representation of the tubular tread wear sensor package.

DETAILED DESCRIPTION OF THE INVENTION

Figure 1:
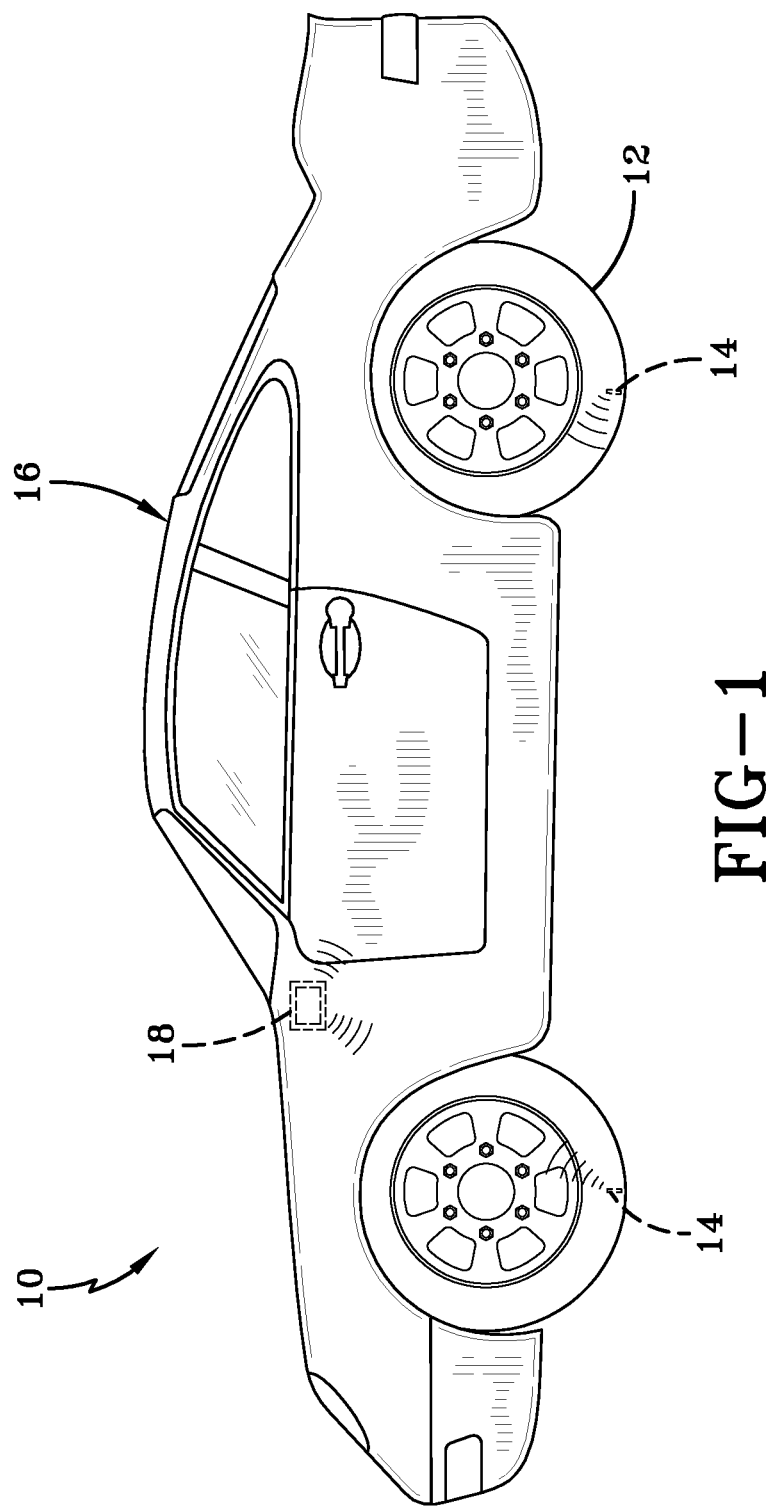
FIG. 1 is a side elevation view of a vehicle having tires equipped with a tread wear measurement device pursuant to the invention.

Referring initially to FIGS. 1, 2 and 3, a tire assembly 10 includes a tire 12 of conventional construction retrofitted to contain one or more wear sensors 14 in a tread region of the tire. The tire supports a vehicle 16 having as part of its electronic processor a receiver 18. While vehicle 16 is shown as a passenger car configuration, it will be appreciated that the subject wear sensor and tire assembly has application to any vehicle type and any vehicle usage.

In the embodiment shown, a sacrificial, wearable sensor is in the form of a thick film (20 to 900 microns) sensor manufactured on thick polymer film substrate. A physical sensing structure is layered onto the film by a printing technique (screen-printing, ink jet, aerosol jet printing, flexography or offset printing), by ink evaporation technique, thin film structure imprinting technique, etching from bulk material, by laminating pre-cut sensing structures, or other techniques. In most of cases a wear sensing structure or path may contain a plurality of independent structures arranged in parallel that allows a multi-level sensing. Such a configuration can function as a binary, yes/no wear detection indicator as in a single conductor loop. To increase sensor robustness, a sensing path or element may be encapsulated by two polymer films. A polymer film sensor assembly may be tightly rolled thus producing a multilayer cylinder which advantageously increases a size or length of the sensing structure or path.

Figure 6A:
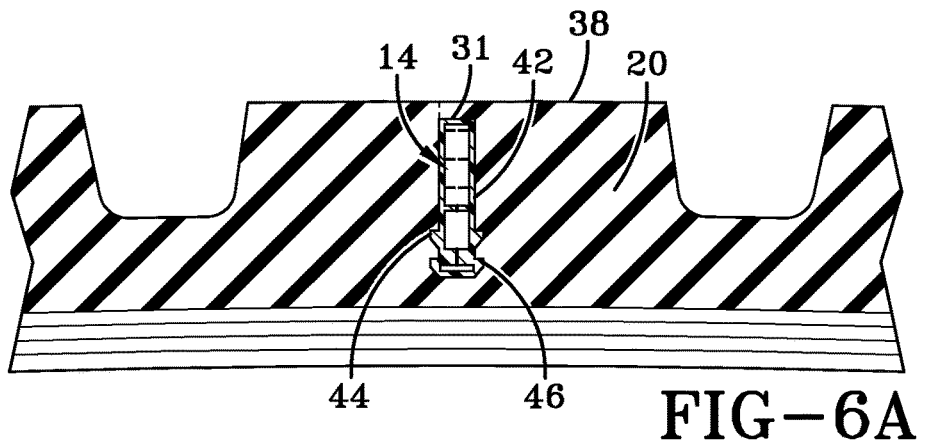
FIGS. 6A through 6D are sequential section views of a tread element having a tread wear sensor mounted therein and showing the configuration of the assembly as the tread element undergoes radial wear.

The tire 12 is provided with tread region including a tread element such as rib 20. Other tire treads having tread elements such as lugs or blocks may be used to incorporate the wear sensor of the subject invention if desired. The wear system front-end 14 is constructed having a generally elongate, tubular configuration. Logic and communications electronics 22, powering electronics 24 and wear sensor device (s) 26 are packaged in a stacked orientation into respective locations along the tubular radial direction. The wear sensor device(s) are situated at an axially outward end region followed by the powering electronics 24 at a mid-region of the radial direction tube and logic and communications electronics 22 at an opposite end of the tube as will be appreciated from FIG. 3. The logic and communication electronics includes RF communication antenna(s) 28 for communicating wear data wirelessly to the vehicle receiver 18. A capacitor and current rectifier 40 is situated to receive and deliver DC current to the electronic circuit 28 from the powering electronics 24. The powering electronics 24 may use battery or capacitive storage of energy to supply system needs. Alternatively, or in conjunction with battery or capacitive storage delivery systems, an energy harvester 30 of a type commercially available may be employed such as any type of mechanical (acceleration, vibration or shock), single or multi-cantilever energy harvester, membrane harvester, or alternatively, a thermoelectric harvester working accordingly to Seebeck-Thompson-Peltier effect. In the sensor end of the tubular package, a series of sensor elements or devices 32, 34, 36 may be stacked at respective axial distances from an end surface 31 of the tubular package. The sensor elements 32, 34, 36 are configured to vary electrical parameters of the sensor circuit when confronting a change in tubular package wear level. For example, the sensor elements 32, 34, 36 may constitute printed R, C or L circuit components or be configured as switches. The elements 32, 34, and 36 thus change the resistance, capacitance, inductance, magnetic or light transmission or refraction parameters of the logic circuit of sensor 14 as the package wears down with the host tread element into which the tubular package is seated. FIG. 2 shows placement of the tubular wear sensor 14 into a tread element such as tread rib 20. The sensor 14 is inserted into the rib 20 in a post-cure procedure in a manner similar to the placement of winter studs into a tire. The insertion procedure radially orients the sensor 14 within the rib 20 as shown. In the radial orientation, the sensor elements 32, 34, and 36 are located radially outward and the communication circuitry 22 is located radially inward relative to the tire tread element 20. An end surface 31 of the tubular wear sensor 14 may, subsequent to insertion, be positioned coplanar with the ground engaging surface 38 of the tread element 20 but, if desired, the end surface 31 may be offset radially inward from the rib surface 38 as shown in FIG. 6A. The flush mount with the top surface of the tread element may be desired for depth calibration.

The sensor elements 32, 34, 36 are stacked in a radial array recessed within at respective radial distances from the tread rib outer surface 38. Each sensor element is wearable and manifests a change in observable physical parameters (e.g. R, C, L, refraction index, optical transmission, magnetic induction) as the tread wears radially down from tire usage. Alternatively, if configured as switches, the elements 32, 34, 36 may be arranged to sequentially switch between antenna(s) as the tread level wears radially inward. The change in electrical properties, or the switching to alternative antenna(s), will modulate the RFID signal from the wear sensor 14 to the antenna 22 and decoded by the receiver 18. An indication of tread wear level may thereby be ascertained.

The modulation of antenna impedance that occurs as a result of a change in electrical property of the circuit elements 32, 34, 36 is detected in the RFID signal. Alternatively, if multiple antennas are deployed in the sensor body and the electrical devices 32, 34, 36 are configured as antenna switches, switching between antennas will occur as the wear level of the tire element 20 reaches each switch radial location. The RFID signal from whichever antenna is switched into operation will thus be indicative of the tread wear level present in the tread element 20.

Figure 4:
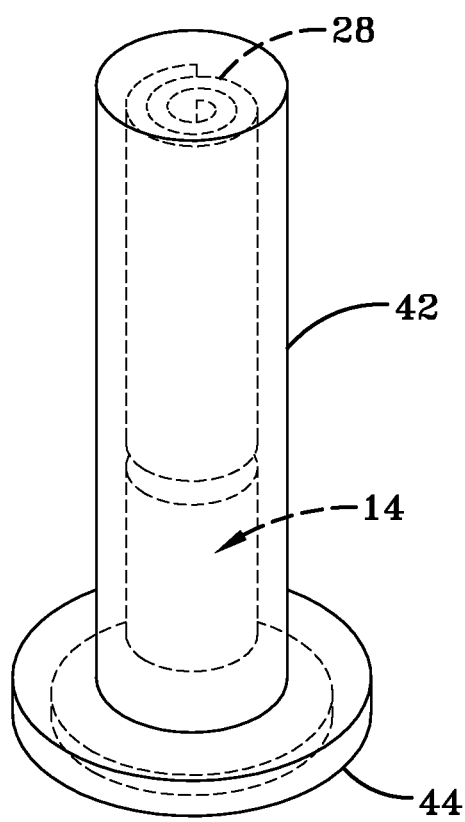
FIG. 4 is a. first embodiment of a tread wear sensor device.
Figure 5:
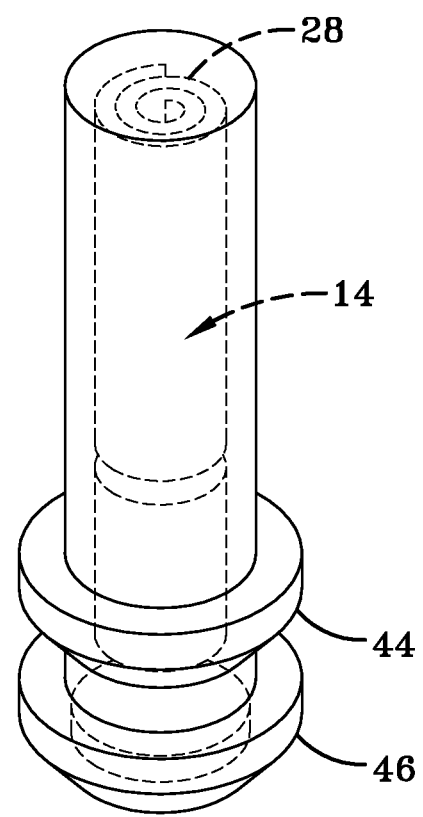
FIG. 5 is a second alternate embodiment of a tread war sensor device.

The sensor (resistive, capacitive, inductive, magnetic, optical, switch) configuration of elements 32, 34, 36 may be folded or wrapped to increase surface area while maintaining the tubular shape of the sensor 14. The sensor 14 may be packages within an outer casing 42 either as in FIG. 4 or alternative casing of FIG. 5. The casing may be formed of a material that wears to allow the sensor to decrease in longitudinal length as the tread rib or block 20 wears radially inward from tire usage. As shown in FIG. 4, an annular base flange may attach to the tubular casing body. In FIG. 5, dual spaced apart annular base flanges 44, 46 are used. The flanges 44, 46 serve to mechanically anchor the sensor 14 into the tread block or rib and resist dislodgement or misalignment of the sensor from the tread element.

Figure 6B:
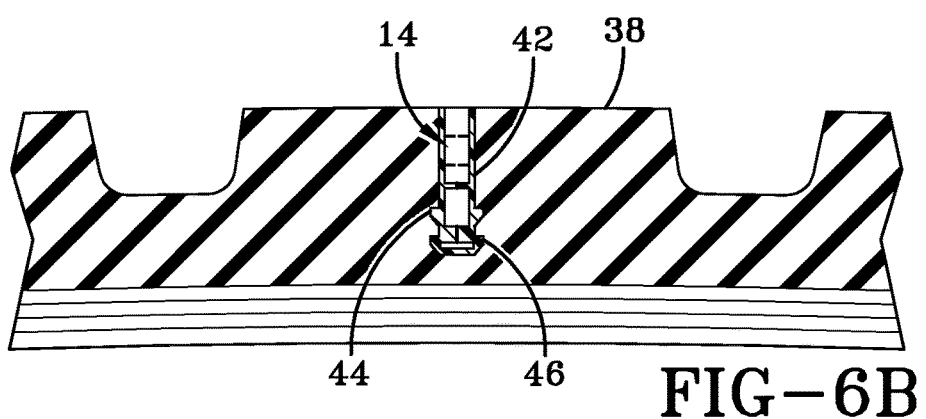
Figure 6C:
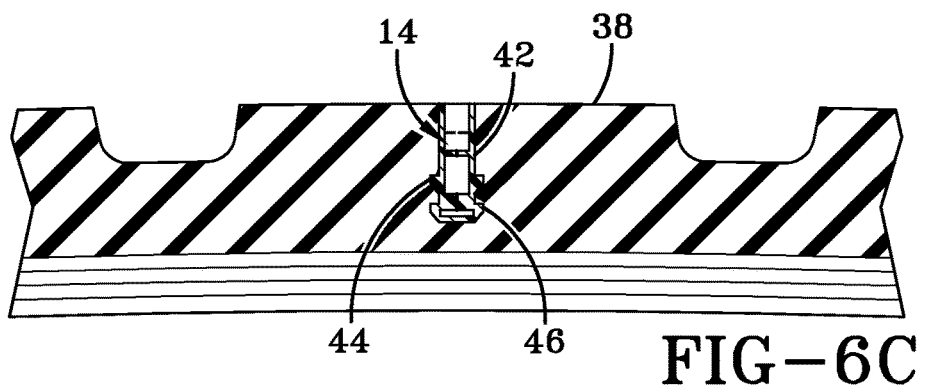
Figure 6D:
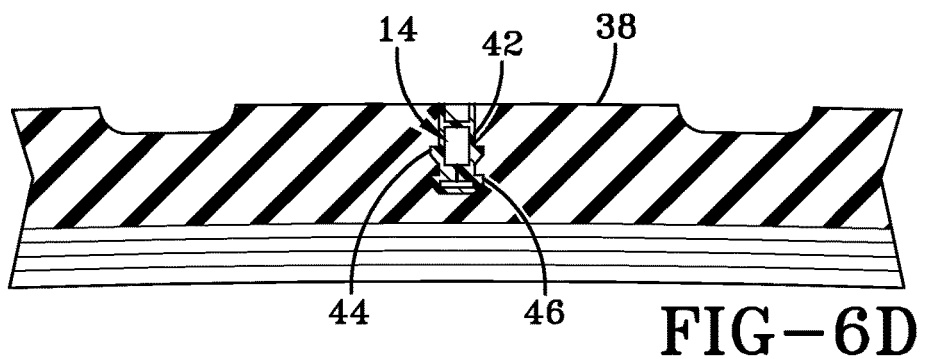

It will be appreciated from FIG. 6A that the sensor 14 within casing 42 is inserted into the tread block or rib 20 after tire cure procedure in a manner similar to insertion of studs into a tire tread in a winter tire. The sensor package 14 is tubular with a base (on inward side toward belt package) that simulates the geometry of winter stud thus making it compatible with existing tooling. The package 14 inserts to a centered and encapsulated location within the rib 20. The insertion places the outer surface 31 of the sensor offset and radially inward from the outward surface 38 of the tread block. The depth of insertion is selected to enable the sensor to measure by elements 32, 34, 36 progression of tread wear at preselected intervals from use of the tire. As will be noted from the sequential depictions of progressive tread wear of FIGS. 6B through 6D, the sensor tubular form shortens with a radially wearing of the tire tread block 20. As the sensor shortens, the sensor elements 32, 34, 36 comprising the sensor 14 are sequentially activated to respectively modulate the signal from the sensor 14 to the receiver 18. More or fewer sensor elements may be employed to provide more or less tread wear measuring sensitivity.

As the elements 32, 34, 36 sequential activate synchronously with tire tread wear, the elements electronically indicate a level of tread wear by modulating the signal transmitted from the logic and communications electronics module 28 to the vehicle receiver 18. The powering electronics 24 (energy harvester, battery or capacitive storage) including associated power management electronics functions to provide an adequate power level to the sensors and communication electronics. As the tread continues to wear, FIGS. 6A and 6B, the signal indicating tread wear information may be translated into communication of varying urgency levels to the operator of the vehicle and remotely communicated to a vehicle operator. When tread wear reaches and activates the radially inward-most sensor element 32, the specific signal to the vehicle operator may be communicated to indicate a critical tire tread condition accompanied by a visual and/or audible warning. More precisely, the reading from at least two independent wear sensors embedded into different tread portions may provide the information of the state of the wear of the tread and of uneven tread wear that may occur between the outer and inner (with respect to the vehicle body) tread portions.

From the foregoing, it will be appreciated that the invention provides a functionally beneficial tire and tread wear sensor assembly that can detect the level of tire tread depth remaining in a tire. The tubular package of the invention is integrated to combine energy source, logic electronics, transmission electronics, and a stacked sensor element array in one package. The components are installed into a tire as an integrated package and together effect communication to the vehicle warning system. The tubular package containing the power, communication, and sensing electronics may be installed after cure as that employed in the installation of winter studs into tires. Thus, the installation procedure is familiar, whereby facilitating easy installation and use of the subject tire tread wear measuring package.

A tread-embedded part of the system (front-end) may remotely communicate to a reader present inside the tire, for example, to the TPMS pressure and temperature monitoring device associated to a RF reader and emitter), to a dedicated, vehicle-independent broadband RF reader provided together with tires fitted with wear sensors and transmitting a wear data further or directly to a Remote Keyless Entry module or to vehicle ECU. Wear sensor data may be communicated by low power RF emissions at low duty cycle frequency (e.g. once a day) to the dedicated in-vehicle reader that will transmit the information through the higher power GSM network to the vehicle owner or driver cellular phone or smart phone.

As every tire is optimally fitted with several independent sensors (optimally three: in outmost left, central, and outmost right portion of the tread) at different locations, every sensor is individually tagged in order to allow further distinction by the reader and to avoid vehicle-to-vehicle cross-talk. Accordingly, tire and tread location must be known for every sensor placement. Additionally, the tire ID tag (tire type (summer or winter), date of production, speed index,) may be advantageously associated to the sensor tag and broadcast to the reader.

Raw sensor data gathered from the plurality of independent tread wear sensors need to be processed prior to indicating the final status to the vehicle owner or driver. The data processing may include a filtering, averaging of a few sensor readings over a given period of time, self-test and consistency check. For example the wear measured by sensor X in time I may be compared with and shall not be bigger than in time X+Y days later.

Sensor data processing prior to the status statement to the vehicle driver is achieved by a dedicated algorithm either hosted in vehicle reader or directly, under the form of downloadable applet, on driver's cellular phone. The final status displayed to the driver may include the information of the state of wear of all tires, i.e., information of remaining tread depth, front wheels versus rear wheel tire wear, in-tire uneven wear (e.g. exterior vs. interior that is frequently resulting from wrong tire/axle geometry), wear dynamics over time, etc. Present and history (stored in the buffer) wear data associated to the tire tag (type, date of production) may serve together for the estimation of remaining tire life. Finally, a provided communication channel to the driver may be used to warn the latter on the need of changing summer tires to winter tires or inversely, coordinated in function with the calendar data available with every cell phone.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A vehicle tire and tread wear device assembly comprising:
   a tire having a radially outward plurality of tread elements;
   at least one tread element projecting from the base of the tread and having a defined tread depth;
   a tread wear indicator having an elongate indicator body embedded within the one tread element, the indicator body extending radially outward to an end surface offset a radial distance from a ground engaging surface of the one tread element;
   the indicator body having at least one sensor element;

power generating means for supplying operational electrical power to the at least one sensor element;
communication means for transmitting a data signal from the at least one sensor element indicative of a radial wear level of the one tread element;
wherein the electric power is supplied by a built-in electromechanical or thermo mechanical energy harvester;
wherein the electrical parameter change is communicated by the communication means to a remote radio frequency receiver;
wherein the indicator body is substantially centered within the one tread element and is substantially in a tubular shape having a longitudinal, radially extending axis;
wherein the at least one sensor element is located radially outward from the power generating means within the tubular shape of the indicator body;
wherein the power generating means is located radially outward from the communications means within the tubular shape of the indicator body; and
wherein the power generating means comprises energy harvesting means for operably harvesting energy from the tire as the tire rolls against a ground surface.

2. The vehicle tire and tread wear device assembly of claim 1, wherein the indicator body shortens in an axial length along with tread wear.

3. The vehicle tire and tread wear device assembly of claim 2, wherein the indicator body maintains a tubular shape throughout a radial wear on the tread element.

4. The vehicle tire and tread wear device assembly of claim 3, wherein the at least one sensor includes a series of radially stacked electronic sensor elements.

* * * * *